United States Patent
Workens

(10) Patent No.: US 7,328,844 B2
(45) Date of Patent: Feb. 12, 2008

(54) POINT-OF-TRANSACTION MACHINE WITH IMPROVED VERSATILITY AND RELATED METHOD

(75) Inventor: Monica L Workens, Boston, MA (US)

(73) Assignee: Darwin Innovations Corporation

( * ) Notice: Subject to any disclaimer, the term of this patent is extended or adjusted under 35 U.S.C. 154(b) by 0 days.

(21) Appl. No.: 10/827,554

(22) Filed: Apr. 19, 2004

(65) Prior Publication Data

US 2004/0195315 A1 Oct. 7, 2004

Related U.S. Application Data

(63) Continuation-in-part of application No. 10/340,065, filed on Jan. 10, 2003, now Pat. No. 6,811,078.

(60) Provisional application No. 60/349,817, filed on Jan. 17, 2002.

(51) Int. Cl.
- G06K 7/08 (2006.01)
- G06K 5/00 (2006.01)
- G07D 11/00 (2006.01)
- G07F 19/00 (2006.01)
- G06Q 40/00 (2006.01)

(52) U.S. Cl. .................. 235/451; 235/379; 235/380; 235/487; 705/39; 705/64

(58) Field of Classification Search ............ 235/375, 235/379, 380, 435, 449, 451, 487, 492, 493; 705/1, 16–18, 39–44, 64

See application file for complete search history.

(56) References Cited

U.S. PATENT DOCUMENTS

| 3,812,328 | A | * | 5/1974 | Tramposch | 235/487 |
|---|---|---|---|---|---|
| 4,634,845 | A |   | 1/1987 | Hale et al. |  |
| 5,220,501 | A |   | 6/1993 | Lawlor et al. |  |
| 5,221,838 | A | * | 6/1993 | Gutman et al. | 235/379 |
| 5,276,311 | A | * | 1/1994 | Hennige | 235/380 |
| 5,285,382 | A | * | 2/1994 | Muehlberger et al. | 705/17 |
| 5,438,186 | A | * | 8/1995 | Nair et al. | 235/449 |
| 5,473,143 | A |   | 12/1995 | Vak et al. |  |
| 5,546,523 | A |   | 8/1996 | Gatto |  |
| 5,578,808 | A |   | 11/1996 | Taylor |  |
| 5,590,038 | A | * | 12/1996 | Pitroda | 705/41 |
| 5,650,604 | A |   | 7/1997 | Marcous et al. |  |
| 5,656,165 | A | * | 8/1997 | Yamamoto et al. | 210/400 |
| 5,770,843 | A |   | 6/1998 | Rose et al. |  |
| 5,859,419 | A | * | 1/1999 | Wynn | 235/487 |
| 5,955,961 | A | * | 9/1999 | Wallerstein | 340/5.4 |
| 5,974,146 | A | * | 10/1999 | Randle et al. | 705/77 |
| 6,098,053 | A | * | 8/2000 | Slater | 705/44 |
| 6,128,598 | A | * | 10/2000 | Walker et al. | 705/4 |
| 6,189,787 | B1 | * | 2/2001 | Dorf | 235/380 |
| 6,223,169 | B1 | * | 4/2001 | Mori et al. | 705/41 |
| 6,308,887 | B1 |   | 10/2001 | Korman et al. |  |

(Continued)

*Primary Examiner*—Daniel Walsh

(57) ABSTRACT

A system and method for conducting sales transactions in a manner that permits a user to access all aspects of their finances to debit or withdraw funds from an account to fund a sales transaction. The system employs a universal account card that permits the user to link to a server associated with a given account. Linking may be achieved through a terminal, which may be employed to read information from the universal account card, and a network that relays information between the server associated with the given account and the terminal.

40 Claims, 6 Drawing Sheets

U.S. PATENT DOCUMENTS

| | | |
|---|---|---|
| 6,328,206 B1 | 12/2001 | Schanz et al. |
| 6,354,490 B1 | 3/2002 | Weiss et al. |
| 6,424,249 B1* | 7/2002 | Houvener ................. 340/5.82 |
| 6,457,640 B2 | 10/2002 | Ramachandran et al. |
| 6,494,367 B1 | 12/2002 | Zacharias |
| 6,512,919 B2* | 1/2003 | Ogasawara ............... 455/422.1 |
| 6,543,684 B1 | 4/2003 | White et al. |
| RE38,137 E | 6/2003 | Wynn |
| 6,857,566 B2* | 2/2005 | Wankmueller .............. 235/380 |
| 6,925,439 B1* | 8/2005 | Pitroda ........................... 705/1 |
| 2001/0002468 A1* | 5/2001 | Nel .............................. 705/26 |
| 2001/0013542 A1* | 8/2001 | Horowitz et al. ........... 235/380 |
| 2001/0013551 A1* | 8/2001 | Ramachandran ....... 235/472.02 |
| 2002/0077977 A1* | 6/2002 | Neely et al. ................. 705/40 |
| 2002/0111918 A1* | 8/2002 | Hoshino et al. ............. 705/65 |
| 2002/0116304 A1* | 8/2002 | Casper et al. ................ 705/35 |
| 2002/0153414 A1 | 10/2002 | Stoutenburg et al. |
| 2002/0174016 A1* | 11/2002 | Cuervo ........................ 705/16 |
| 2002/0174065 A1* | 11/2002 | Coward ....................... 705/39 |
| 2003/0023498 A1* | 1/2003 | Benton ........................ 705/26 |
| 2003/0046224 A1* | 3/2003 | Mujtaba et al. .............. 705/39 |
| 2003/0061156 A1* | 3/2003 | Lim ............................. 705/39 |
| 2003/0061157 A1* | 3/2003 | Hirka et al. .................. 705/39 |
| 2003/0080185 A1* | 5/2003 | Werther ...................... 235/380 |
| 2003/0126075 A1* | 7/2003 | Mascavage et al. .......... 705/39 |
| 2003/0130940 A1* | 7/2003 | Hansen et al. ................ 705/39 |
| 2003/0154164 A1* | 8/2003 | Mascavage et al. .......... 705/39 |
| 2003/0200179 A1* | 10/2003 | Kwan .......................... 705/65 |
| 2003/0233317 A1* | 12/2003 | Judd ........................... 705/39 |
| 2003/0233325 A1* | 12/2003 | Belyi .......................... 705/42 |
| 2004/0002917 A1* | 1/2004 | Horn et al. ................... 705/39 |
| 2004/0010457 A1* | 1/2004 | Kakuta ........................ 705/33 |
| 2004/0024700 A1* | 2/2004 | Petigny ....................... 705/39 |
| 2004/0030605 A1* | 2/2004 | Ling ........................... 705/26 |
| 2004/0088248 A1* | 5/2004 | Cutler ......................... 705/38 |
| 2004/0111367 A1* | 6/2004 | Gallagher et al. ............ 705/39 |
| 2004/0112952 A1* | 6/2004 | Algiene et al. .............. 235/379 |
| 2004/0138955 A1* | 7/2004 | Song et al. ................... 705/17 |
| 2004/0155101 A1* | 8/2004 | Royer et al. ................ 235/379 |
| 2004/0193539 A1* | 9/2004 | Sullivan ...................... 705/39 |
| 2004/0210449 A1* | 10/2004 | Breck et al. ................... 705/1 |
| 2005/0038738 A1* | 2/2005 | Peck et al. ................... 705/40 |
| 2005/0044021 A1* | 2/2005 | Schafer ....................... 705/35 |
| 2005/0065875 A1* | 3/2005 | Beard .......................... 705/38 |
| 2005/0080634 A1* | 4/2005 | Kanniainen et al. ........... 705/1 |
| 2005/0108157 A1* | 5/2005 | Bushman et al. ............. 705/40 |
| 2005/0125343 A1* | 6/2005 | Mendelovich ............... 705/39 |
| 2005/0184145 A1* | 8/2005 | Law et al. .................. 235/380 |
| 2005/0192895 A1* | 9/2005 | Rogers et al. ................ 705/39 |
| 2005/0256801 A1* | 11/2005 | Bucci et al. .................. 705/39 |
| 2005/0279827 A1* | 12/2005 | Mascavage et al. ........ 235/380 |
| 2006/0036541 A1* | 2/2006 | Schleicher ................... 705/39 |
| 2006/0149665 A1* | 7/2006 | Weksler ....................... 705/38 |
| 2006/0206425 A1* | 9/2006 | Sharma ....................... 705/40 |

* cited by examiner

POINT-OF-TRANSACTION MACHINE WITH IMPROVED VERSATILITY AND RELATED METHOD

CROSS-REFERENCE TO RELATED APPLICATIONS

This application is a continuation-in-part of U.S. patent application Ser. No. 10/340,065 filed Jan. 10, 2003 now U.S. Pat. No. 6,811,078 entitled "Point-of-Transaction Machine With Improved Versatility and Related Method", which claimed claims the benefit of U.S. Provisional Patent Application Ser. No. 60/349,817, filed Jan. 17, 2002.

INTRODUCTION

The present invention generally pertains to systems and methods for conducting sales transactions in a manner that permits a consumer to fund the sales transaction using various accounts, such as banking, checking, money market, credit and securities.

Sales transactions are typically funded with cash, negotiable instruments or equivalents thereof (e.g., checks, debit cards), or credit in a manner that has changed little over the past fifty years from the consumer's perspective. Modern consumers, however, are much more financially diverse than the consumers of even 20 years ago and as such, the conventional methods of funding a sales transaction can be relatively inconvenient. In this regard, modern consumers will typically have to juggle funds between accounts, a securities or money market account and a checking account, for example, in advance of the sales transaction. Frequently, the accounts are not maintained at the same institution and as such, there are delays in the time between the withdrawal or removal of funds from one account and the deposit of those funds into a different account. While electronic fund transfers have improved this situation, there nonetheless remains a delay of at least one business day.

Accordingly, there remains a need in the art for an improved system and method for conducting a sales transaction that permits a consumer to access all aspects of one's finances to withdraw funds (i.e., cash or a cash equivalent or substitute) from an account and transfer those funds to consummate a sales transaction.

SUMMARY

In one form, the present teachings provide a method that includes: providing a universal account card having a memory, the memory storing a plurality of account identifiers, each account identifier being associated with an account which may be debited to fund a sales transaction, at least one of the account identifiers being associated with a securities account; reading the account identifiers from the universal account card; selecting one of the accounts to fund the sales transaction; and debiting the one account to obtain proceeds to fund the sales transaction.

In another form, the present teachings provide method that includes: providing a universal account card having a memory, the memory storing a plurality of account identifiers, each account identifier being associated with an account which may be debited to fund a sales transaction, each account identifier being associate with a financial institution, a non-financial institution or a cash account, at least one of the account identifiers being associated with a securities account at a non-financial institution; reading the account identifiers from the universal account card; selecting one of the accounts to fund the sales transaction; withdrawing funds from the one account; and transferring at least a portion of the withdrawn funds to a seller account to at least partially consummate the sales transaction.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE VARIOUS EMBODIMENTS

Figure 1:
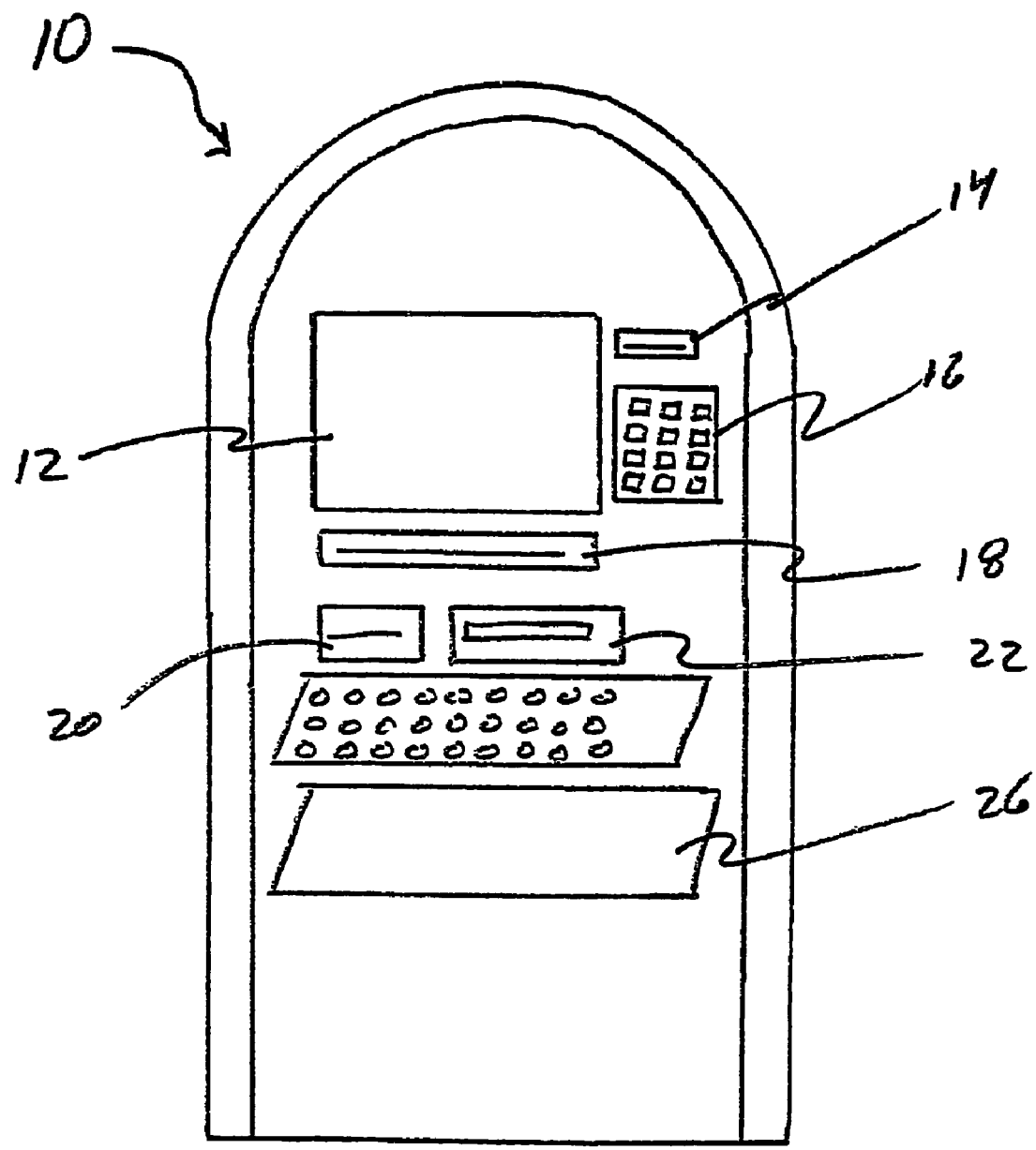
FIG. 1 is a simplified front view of an automated teller-type machine constructed in accordance with the teachings of the present invention.
Figure 2:
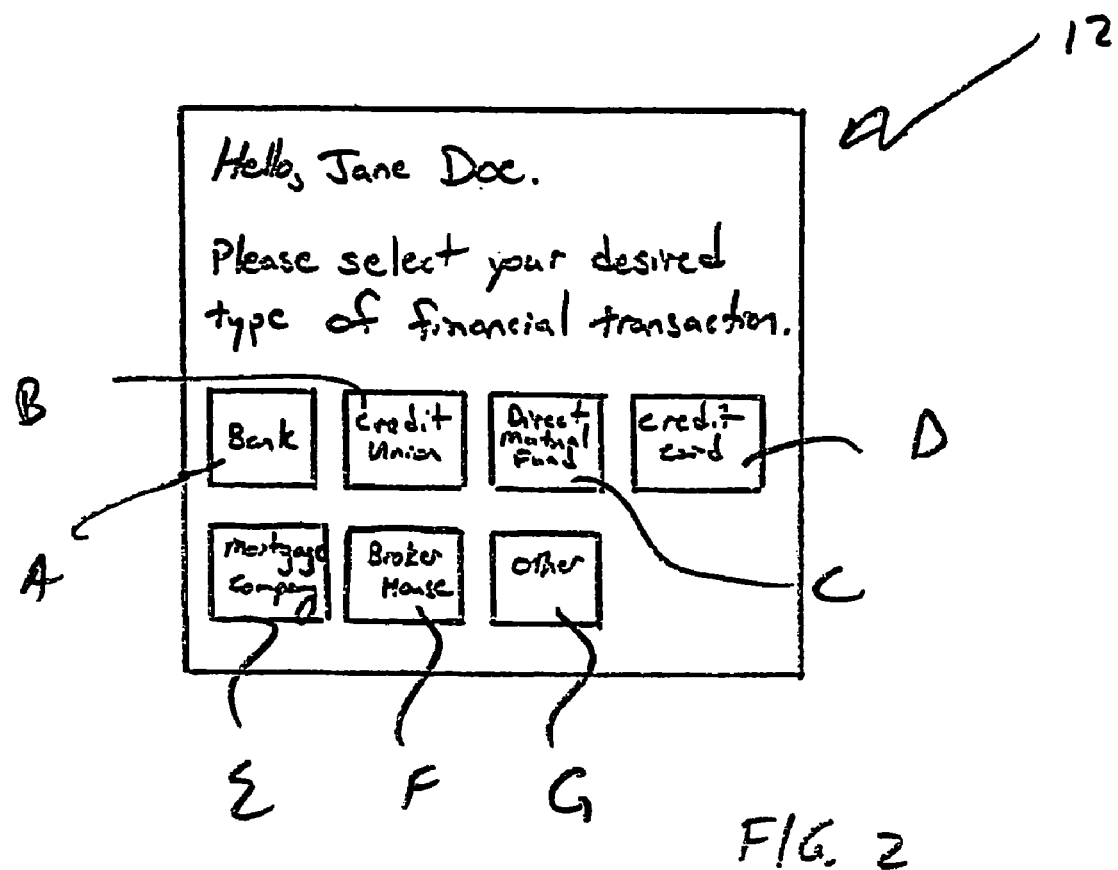
FIG. 2 is an enlarged and simplified front view of the touch responsive screen of the automated teller-type machine of FIG. 1.

With general reference to FIGS. 1 and 2 of the drawings, a point-of-transaction machine constructed in accordance with the teachings of a preferred embodiment of the present invention is illustrated and generally identified at reference element 10. The teachings of the present invention are shown incorporated into an exemplary embodiment. However, those skilled in the art will readily appreciate after reading the remainder of this detailed description that the teachings of the subject invention are not so limited. In this regard, arrangements other than that shown in the drawings will be understood to fall within the scope of the present invention.

The point-of-transaction machine 10 of the present invention is an automated teller-type machine that can be publicly located for the convenience of the customers. It is anticipated that the point-of-transaction machine 10 will be made available in much the same way that conventional ATMs are made available. In this manner, the point-of-transaction machine 10 can be accessible any day, at any time.

The point-of-transaction machine 10 is illustrated to generally include a touch responsive screen 12, a card reading device 14, a numerical keypad 16, and a dispensing mechanism 18 for dispensing cash and receipts 18. The point-of-transaction machine 10 is additionally illustrated to generally include a deposit mechanism 20 that permits the user/customer to deposit cash, checks and executed documents and a deposit envelope holder 22. In the preferred embodiment, the point-of-transaction machine 10 is further illustrated to generally include a keyboard 24, a shelf 26 for the placement of purses, daytimers, briefcases and the like, and an arcuate surround 28 that contributes to a modern appearance of the point-of-transaction machine and increases user privacy.

With particular reference to FIG. 2, an initial screen of the touch responsive screen 12 of the point-of-transaction machine 10 is illustrated. The initial screen greets the particular user in response to insertion of a readable card (not shown), such as a magnetically readable card, and provides various options for financial transactions. In one particular application, the readable card is coded so as to generate a specific user screen that only includes options authorized for use by the customer. The readable card is preferably a card specifically designated for use with the point-of-transaction machine. Alternatively, it may be desired in certain applications to allow the user/customer to access the point of sale machine 10 with an authorized credit card.

In the application illustrated, the screen allows the user to select from the following types of financial transactions: banking A, credit union B, direct mutual fund C, credit card D, mortgage company E, brokerage house F, or other G. The other G options may include bill paying to designed service providers (e.g., utilities). While not illustrated, the point-of-transaction machine will also preferably allow a user to check stock quotations. Services fees for stock quotations can be done on a per quote basis or on a monthly or annual subscription basis. In some applications, the point-of-transaction machine 10 is further able to transmit e-mail messages.

Figure 3:
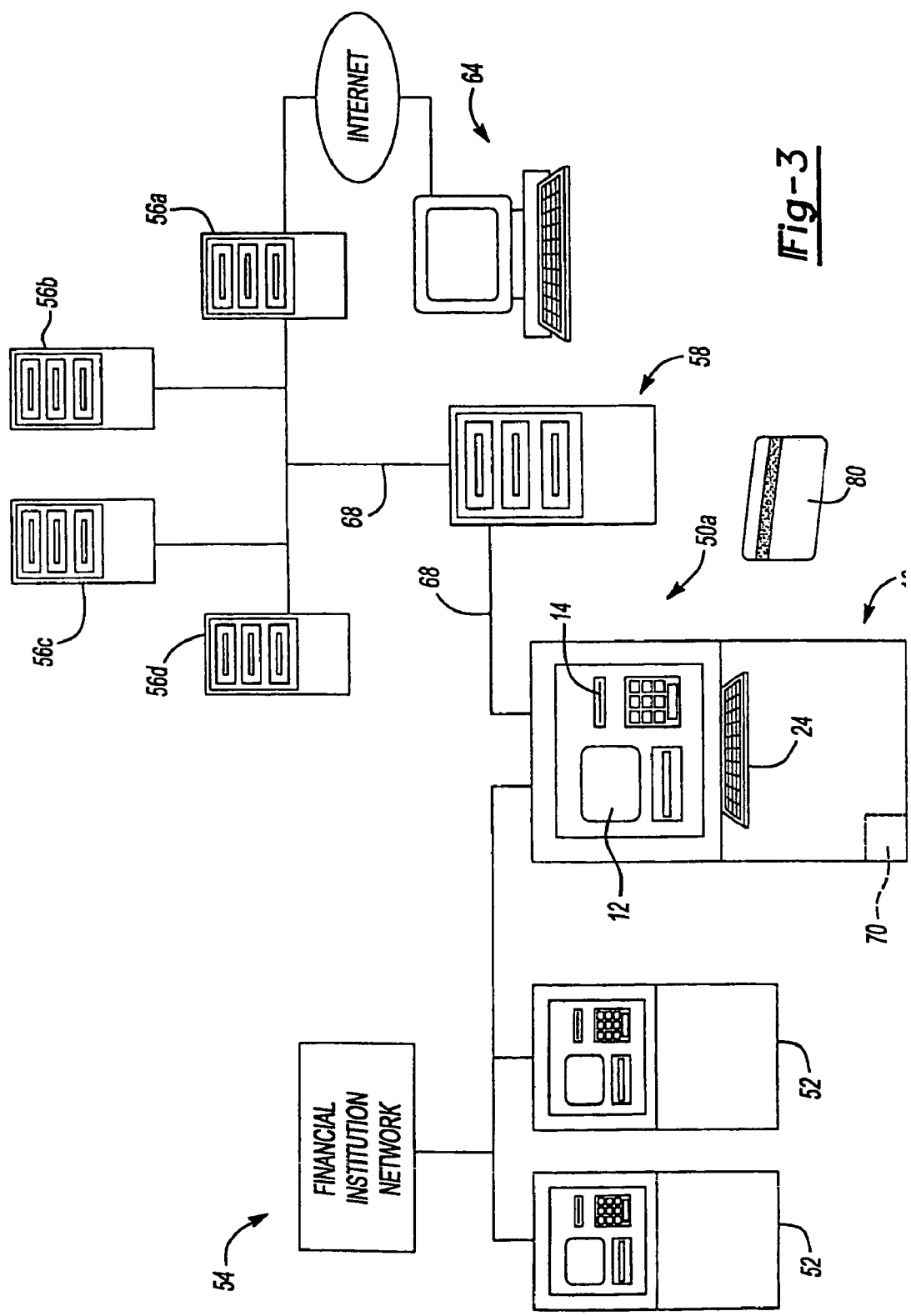
FIG. 3 is a schematic view of a first financial network constructed in accordance with the teachings of the present invention.

With reference to FIG. 3, a financial network constructed in accordance with the teachings of the present invention is generally indicated by reference numeral 50*a*. The financial network 50*a* of this example is illustrated as including one or more optional legacy ATMs 52, a financial institution network 54, one or more independent financial service servers 56, a point-of-transaction machine 10*a* and a financial services application server 58.

The legacy ATMs 52 are conventional in their construction and operation and are sufficiently well known in the art so as not to require a detailed discussion of their construction and operation. Briefly, the legacy ATMs 52 are coupled to the financial institution network 54 and permit users of the legacy ATMs 52 to conduct financial transactions (e.g., deposits, withdrawals and balance inquiries, hereinafter referred to as "banking transactions") from an account at a particular financial institution. Those skilled in the art will appreciate that various financial institution networks may be coupled to one another to thereby permit the user of the legacy ATM 52 to access their financial institution through the legacy ATM of another financial institution. In the example provided, the legacy ATMs 52 and the financial institution network 54 communicate via a Systems Network Architecture/Synchronous Data Link Control (SNA/SDLC) protocol using a suitable messaging protocol, such as the Diebold 912 messaging protocol.

The independent financial service servers 56 are likewise conventional and sufficiently well known so as not to require a detailed discussion of their construction and operation. Briefly, each independent financial service server 56 is associated with a particular financial service provider that may, for example, provide brokerage, mortgage, utility and/or credit card servicing services. In the particular example provided, the independent financial servers 56 include a brokerage server 56*a*, a mortgage server 56*b*, a utility server 56*c* and a credit card servicer server 56*d*. The brokerage server 56*a* is operated by a particular brokerage house, such as E*Trade, Quick & Reilly and Charles Schwab, and enables a customer to conduct brokerage transactions through the brokerage house. The mortgage server 56*b*, utility server 56*c* and credit card servicer server 56*d* are likewise operated by a particular mortgage broker, utility and credit card servicer, respectively, and enable a customer to conduct transactions relating to mortgages, utilities and credit card accounts, respectively, through the mortgage broker, utility and credit card servicer, respectively. Financial transactions conducted through the independent financial service servers 56 are hereinafter referred to as "non-banking transactions". The financial network 50*a* is illustrated as including a set of independent financial service servers 56, each of whom provides a distinct set of financial services. Those skilled in the art will appreciate, however, that the financial network 50*a* may be configured with a set of independent financial service servers 56 with several of such servers providing competing services. For example, the financial network 50*a* may be coupled to several brokerage servers 56*a* to thereby permit the customer to choose amongst several brokerage houses for carrying out a particular brokerage transaction. Those skilled in the art will also appreciate that the set of independent financial service servers 56 may additionally include one or more discrete (i.e., competing) financial institution networks that are similar to the financial institution network 54 to thereby permit a customer to remotely conduct financial transactions at another financial institution.

The customer is typically identified by a financial service provider through a user identification and password, each of which being typically composed of 5 to 15 alpha-numeric characters. In some instances, the financial service provider may provide Internet access to their independent financial service server 56 to permit a customer to remotely access their accounts. In such situations, the user identification and password are ordinarily input by the customer via an alpha-numeric keyboard device at a computer terminal 64, which may be a personal computer, for example.

Communications between the independent financial service server 56 and the computer terminal 64 preferably utilize conventional and well known protocols, such as TCP/IP, which dictate the manner in which data is transmitted between the independent financial service server 56 and the computer terminal, as well as a conventional and well known languages, which dictate the structure of the data that is transmitted between the independent financial service server 56 and the computer terminal. Data may be transmitted, for example, using Hyper Text Markup Language (HTML), which leaves the visual details (appearance) of the document to the end-user software; such as an Internet Browser program.

The point-of-transaction machine 10*a* and the financial services application server 58 cooperate to provide a means by which both traditional ATM services and independent financial services may be provided in a relatively secure manner at a single publicly accessible terminal. More specifically, the point-of-transaction machine 10*a* and the financial services application server 58 cooperate to control transaction routing, perform cardholder verification and PIN processing, and provide transaction integrity management, electronic security, device monitoring, external communications protocols and node interfaces and exchanges.

The financial services application server 58 is coupled to the independent financial service servers 56 over a private frame relay 68 and is operable for sending data to and receiving data from the independent financial service servers 56 on an as needed basis. In the particular embodiment provided, the financial services application server 58 will be understood as employing TCP/IP protocol and HTML for communicating with the financial service servers 56.

The point-of-transaction machine 10*a* is generally similar to the point-of-transaction machine 10 and as such, will not be discussed in significant detail other than to note that it includes hardware, including at least one computer 70, and software that permit the computer 70 to communicate with the financial institution network 54 in the manner (i.e., protocol and language) of the legacy ATMs 52, as well as with the financial services application server 58. In the particular example provided, the computer 70 communicates with the financial institution network 54 via the protocol and language that is utilized by the legacy ATMs 52 (e.g., with SNA/SDLC protocol and Diebold 912 messaging). Also in the particular embodiment provided, the computer 70 communicates with the financial services application server 58 via the private frame relay 68 using the TCP/IP protocol and HTML. More specifically, the computer 70 includes a network interface card (not shown) that permits the browser software running on the computer 70 to initiate an Uniform Resource Locator (URL) request when the customer desires to conduct a transaction with a particular financial services provider. In one alternative approach, the computer 70 may be configured to communicate with both the financial institution network 54 and the financial services application server 58 utilizing the protocol and language that is utilized by the legacy ATMs 52. In this latter approach, the financial services application server 58 must adapt the HTML data received from the independent financial service servers 56 to conform to the data structure and format of the legacy ATMs 52.

Those of ordinary skill in the art will appreciate, however, that regardless of the approach taken, each and every financial service provider (i.e., each independent financial service server 56) will either need to employ a standardized data interface or that the financial services application server 58 will need to "massage" the data received from each of the independent financial service servers 56 so that the data conforms to a predefined standard that may be transmitted directly to the point-of-transaction machine 10*a* or alternatively converted to a protocol and language of the type that is utilized by the legacy ATMs 52.

Also alternatively, the financial services application server 58 may function solely as an intermediary that passes data between the independent financial service servers 56 and the point-of-transaction machine 10*a*. This configuration has the advantage over the above-described variations of providing the customer with screens for accessing accounts and conducting transactions at such financial services providers that are identical to those that they would otherwise access remotely via a computer terminal 64 as described above.

In operation, a customer preferably accesses the point-of-transaction machine 10*a* by inputting (e.g., swiping) a readable card 80 (e.g., a magnetically readable card) through the card reading device 14 and inputting a PIN to provide access to all of the types of financial transactions that are available through the point-of-transaction machine 10*a*. Configuration in this manner avoids the burden of redundant authentication. Alternatively, the keyboard 24 and/or the touch responsive screen 12 may be utilized to manually input the customer's password and user identification in the event that the customer desires to access one or more of the independent financial service servers 56.

The point-of-transaction machine 10*a* may be configured to utilize any desired type of readable card, and as such, the readable card 80 may be of a relatively simple type that only includes a magnetic strip that contains account number data, for example. Additionally or alternatively, the point-of-transaction machine 10*a* may be configured to read other types of readable cards, such as those having micro-chips which will be referred to hereinafter as Universal Account Cards (UAC). Such UAC's are able to store information, including the balance, of various accounts that are established for the convenience of the customer. One account may be utilized for payment of mass transit or for products purchased from vending machines, for example, wherein funds are prepaid into the account by the user and thereafter the account is electronically debited when the UAC (i.e., the account) is utilized to purchase services or products. Accordingly, the point-of-transaction machine 10*a* may be utilized to review the balance of such accounts and electronically deposit funds or withdraw funds from such accounts. As such financial transactions are not traditional "banking transactions", they will be considered herein as "non-banking transactions".

As those skilled in the art will appreciate, any means may be employed for correlating the readable card 80, the PIN and a customer's various user identification and password codes. In the example provided, the financial services application server 58 includes a user identification/password database that is accessible when the readable card 80 is swiped, the corresponding PIN is input and financial services other than those that are available through the financial institution network 54 are requested by the customer at the point-of-transaction machine 10*a*. Verification of the PIN number (i.e., correlation of the readable card 80 to the PIN number) preferably occurs through the financial services application server 58 but may alternatively occur through the financial institution network 54 and relayed to the financial services application server 58 via the point-of-transaction machine 10*a*.

Alternatively, the financial institution network 54 may include a user identification/password database that is accessible when the readable card 80 is swiped and the corresponding PIN is input and verified through the financial institution network 54. When financial services other that those that are available through the financial institution network 54 are requested by the customer at the point-of-transaction machine 10*a*, the user identification and password codes are transmitted to the financial services application server 58 via the point-of-transaction machine 10*a*.

Figure 4:
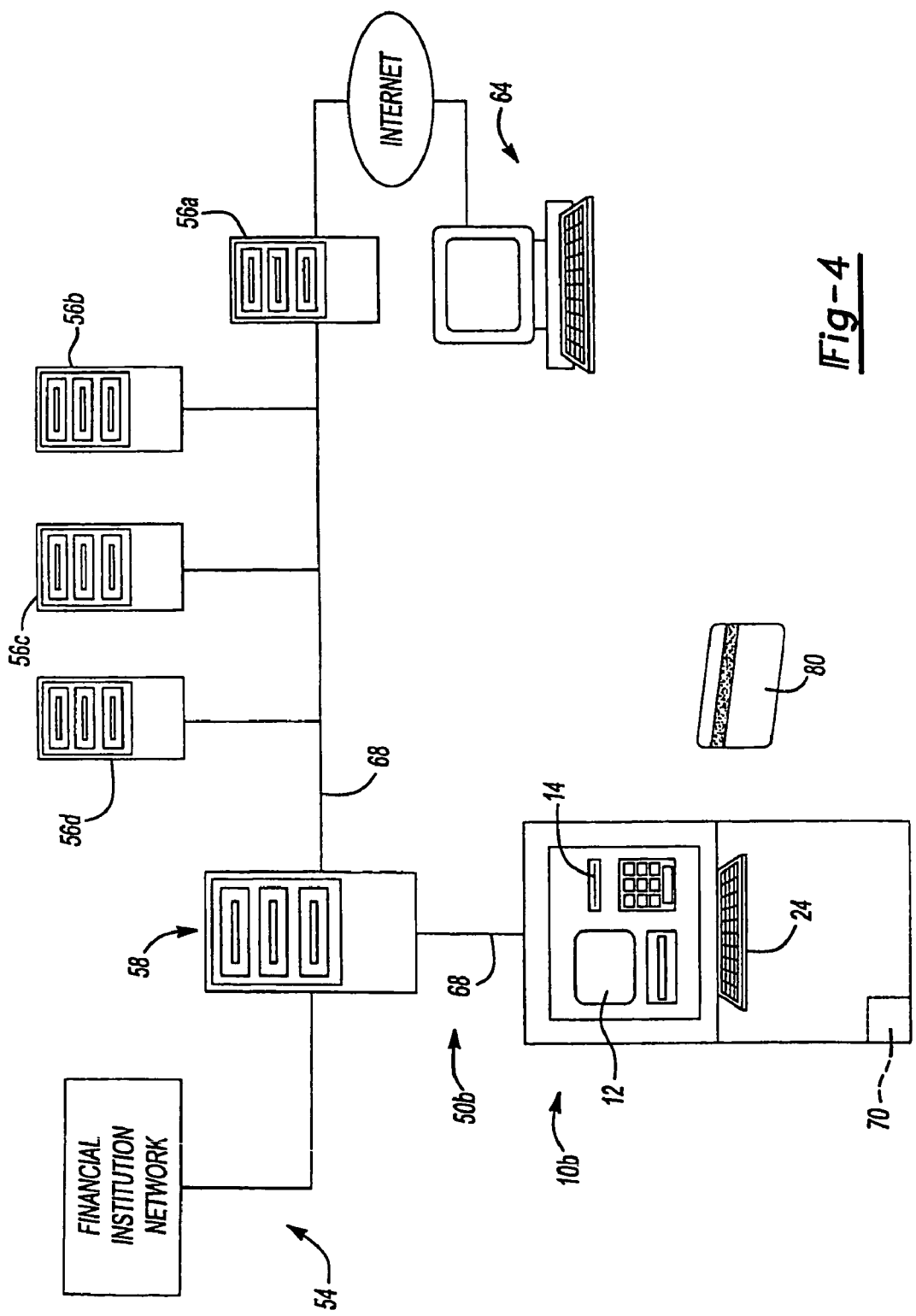
FIG. 4 is a schematic view of a second financial network constructed in accordance with the teachings of the present invention.

With reference to FIG. 4, a second financial network constructed in accordance with the teachings of the present invention is generally indicated by reference numeral 50*b*. The financial network 50*b* of this example is generally similar to the financial network 50*a*, except that a) it does not include legacy ATMs; b) a point-of-transaction machine 10*b* has been substituted for the point-of-transaction machine 10*a*; and *c*) the financial services application server 58*a* is coupled to both the independent financial service servers 56 and the financial institution network 54. The point-of-transaction machine 10*b* is identical to the point-of-transaction machine 10*a* except that it is configured to exclusively communicate with the financial services application server 58.

As noted above, the financial services application server 58 is employed to access both the independent financial service servers 56 and the financial institution network 54. The financial services application server 58 preferably communicates with the independent financial service servers 56, the financial institution network 54 and the point-of-transaction machine 10b utilizing Internet protocols and languages (e.g., TCP/IP and HTML) but may alternatively employ Internet protocols and languages to communicate with the independent financial service servers 56, another protocol and language to communicate with the financial institution network 54 and either of these protocol and language combinations to communicate with the point-of-transaction machine 10b.

Figure 5:
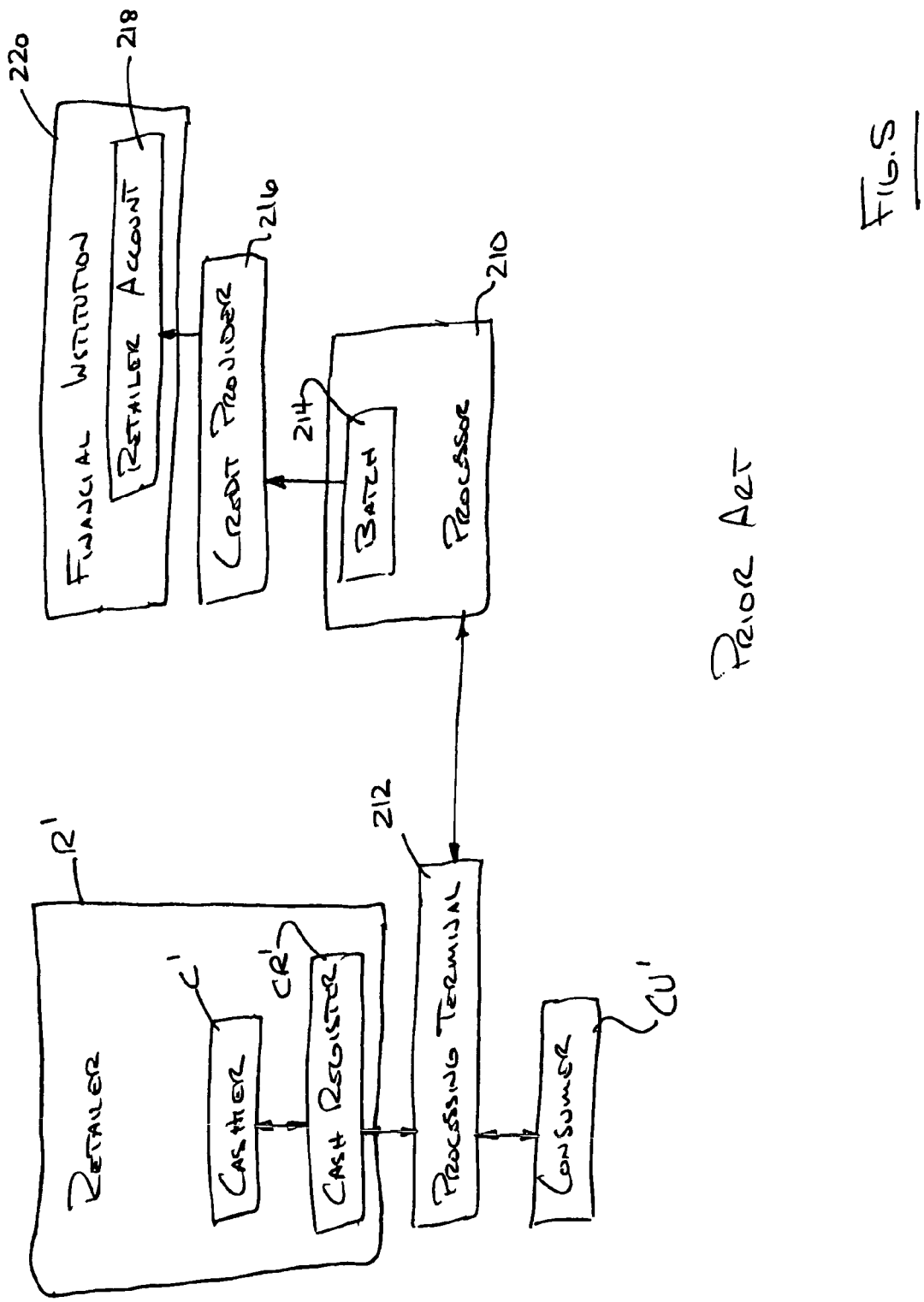
FIG. 5 is a schematic illustration of a prior art system for conducting sales transactions with a credit card.

With reference to FIG. 5, a system for conducting credit card transactions is designated by reference numeral 200. The system 200 includes a processor 210 and a processing terminal 212, which may communicate with the processor 210 through any conventional means, including a phone line. The processing terminal 212 may be employed by a retailer R' and may be coupled to a cash register CR' to facilitate the transmission of data therebetween.

In one common type of retail transaction involving a credit card, a cashier C' and a consumer CU' may interact through the cash register CR' and the processing terminal 212. The cash register CR' may upload information, which may include a transaction amount, to the processing terminal 212, while the processing terminal 212 may receive one or more inputs from the consumer CU', such as a credit card account, which may be input through an appropriate means, such as the swiping of a magnetic strip.

The processing terminal 212 communicates with the processor 210 to authorize a transaction. More specifically, the processing terminal 212 communicates a set of data, which may comprise a credit card account and a transaction amount, to the processor 210. The processor 210 may verify a status and credit capacity of the credit card account and selectively generate an approval (or denial) of the transaction based on the account status, credit capacity and transaction amount. An approval (or denial) of the transaction may be communicated to the processing terminal 212 to permit the retailer R' to complete the transaction with the consumer CU'.

In situations where the processor 210 approves a transaction, funds generated by the transaction are not immediately available to the retailer R'. In this regard, the processor 210 logs the approved transaction in a batch 214 until the occurrence of a predetermined event, such as the end of a business day. Upon the occurrence of the predetermined event, the processor 210 releases the approved transactions from the batch 214 and each approved transaction is routed to an associated credit provider 216 who in turn routes funds to the account 218 at the financial institution 220 of the retailer R' where they are available to the retailer R' for withdrawal. For its role in the process, the processor 210 levies a fee on the retailer R', typically on the order of about $0.20 to about $0.25, for each transaction that is authorized.

Figure 6:
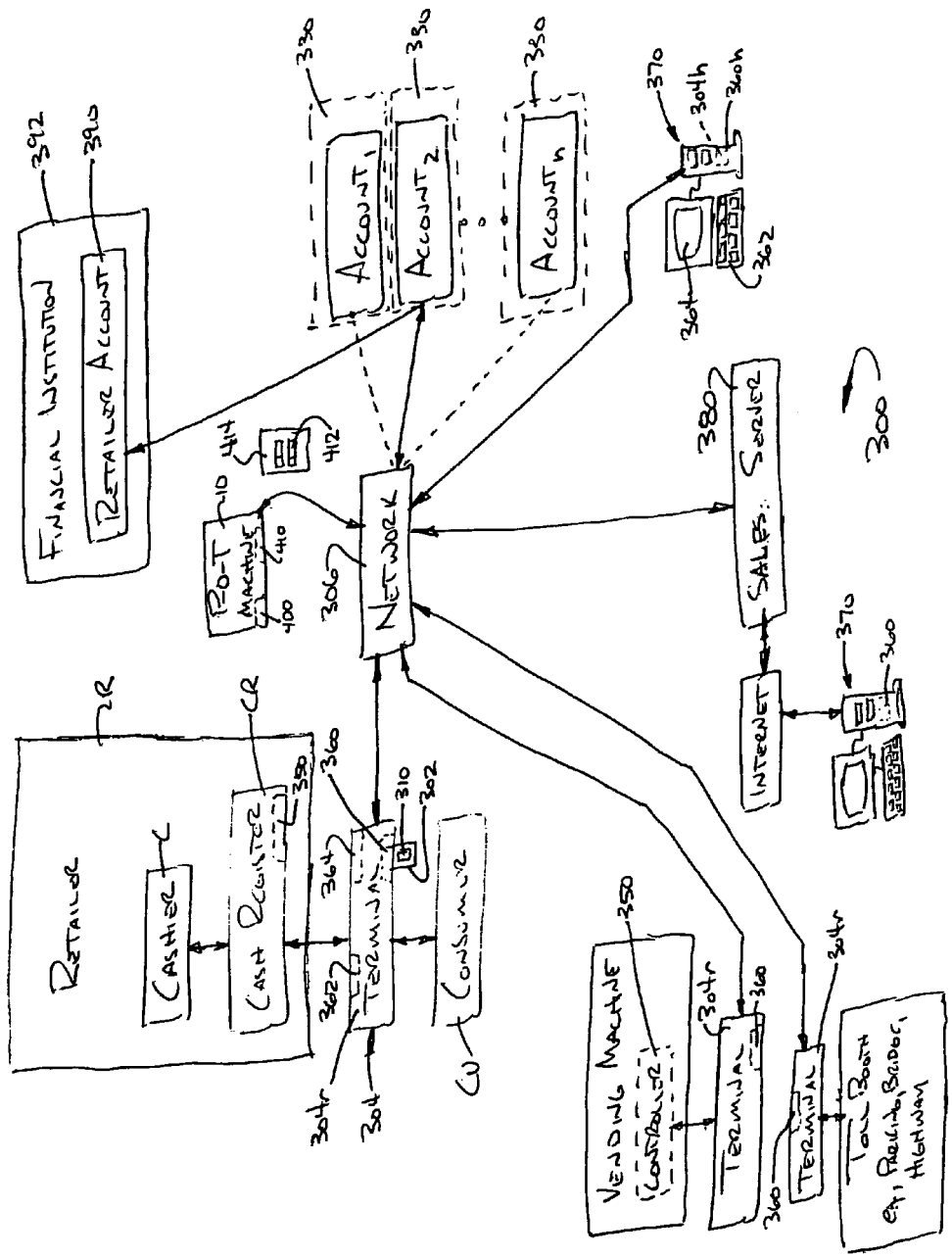
FIG. 6 is a schematic illustration of a payment system for conducting sale transactions constructed in accordance with the teachings of the present invention.

With reference to FIG. 6, a system for conducting transactions constructed in accordance with the teachings of the present invention is generally indicated by reference numeral 300. The system 300 may include a universal account card 302, a plurality of terminals 304 and a network 306 that cooperate to permit a user to pay for a consumer transaction using funds or credit from virtually any aspect of one's finances. The universal account card 302, which may be about the size of a conventional credit card, includes a memory 310 that facilitates the storage of information, such as various account identifiers and security features. The memory 310 may be any appropriate type of memory that permits the universal account card 302 to be updated on a periodic basis to add, delete or modify account information associated with one or more of the account identifiers 320.

The account identifier may be a coded or random sequence of characters that may be de-coded by the network 306 for improved security or may include a routing number, which associates the account identifier with a particular account provider 330, and an account number and optionally, a three or four digit code of the type that is typically listed on the reverse of a credit card.

The terminals 304 may comprise one or more sales terminals 304r and/or one or more home terminals 304h. The sales terminals 304r may be configured to communicate with a controller 350 that may be associated with a cash register CR or a vending machine V, for example. In this regard, the sales terminal 304r and the controller 350 communicate with one another to permit the transaction amount to be transmitted to the sales terminal 304r and an approval to be transmitted from the sales terminal 304r to the controller 350. In response to the receipt of an approval from the sales terminal 304r, the controller may be operable for generating a receipt and/or for further facilitating the transaction, which may consist of activating the vending machine V to dispense a selected article. Those of ordinary skill in the art will appreciate that although the controller 350 has been discussed in association with a vending machine V for dispensing purchased articles, the invention in its broader aspects, may be used to facilitate the purchase goods, services, etc. through other devices, including parking meters, pay telephones, toll booths, tickets for amusement parks and movie theatres, etc.

Each sales terminal 304r may be operable for communicating transactional information, such as an account identifier and a transaction amount, to the network 306 and may include a means for reading information stored on the universal account card 302, such as a reader 360, an input means 362, such as a keyboard or keypad, and a display means 364 for displaying information, such as an LCD screen. The input means 362 and the display means 364 may be discrete devices, such as a keypad and an LCD monitor, respectively, or may be combined with one another in the form of a touch-responsive screen for example. The input means 362 may be employed as one means for verifying an identity of the user of the universal account card 302. For example, a keypad or touch responsive screen may be employed by the user of the universal account card 302 to manually input PIN or password. Additionally or alternatively, a biometric device (e.g., retina or finger print scan, face or voice recognition) or an identifier, such as an RF chip, that may be embedded into a key fob, an article of jewelry (e.g., a ring), or the user themselves, may be employed to verify that the use of the universal account card 302 is authorized.

The home terminals 304h may be coupled to a personal computer 370 and may include a card reader 360h that permits the information on the universal account card 302 to be read. The home terminals 304h may be configured to communicate directly with the network 306 as will be described below, or may be configured to transmit the account identifier information over the Internet to a secure sales server 380, which in turn relays the information to the network 306. In the former case, the home terminal 304h may also be employed to modify (e.g., add, delete and/or change) the information that is stored on the universal account card 302.

The network 306 may be configured to communicate with the terminals 304, one or more participating independent financial service servers 56 and optionally to one or more financial services application servers 58 and/or to one or more credit card servicer servers 56d. Communication with the network 306 may be made through any appropriate means, such as a VPN (virtual private network).

As a non-limiting example of the capabilities and operation of the system 300, the universal account card 302 shown in use in a sales setting. In the example provided, the terminal 304 is coupled to a cash register CR and receives a transaction amount therefrom. The consumer CU employs the terminal 304 to activate the universal account card 302, which may entail the loading of the universal account card 302 into the card reader followed by the verification of the user's identity/authority to use the universal account card. In the example provided, the user's identity and authority to use the universal account card 302 is verified through the input of a PIN. Additionally, the universal account card 302 may include a security code and/or another security device that may be employed to designate that the universal account card 302 has been manufactured and/or distributed in an appropriate manner. If the additional security code and/or device is missing from a card, the terminal 304 may be configured so as to halt the transaction and alert the retailer R or another person that the card has not been obtained from an appropriate issuer.

When the user's identity and/or authority to use the universal account card 302 has been established, the display means 364 of the terminal 304 may display icons and/or information related to each of the account identifiers that are stored on the universal account card 302. The icons and/or information that is displayed may be taken from the memory of the universal account card 302 either directly, indirectly (e.g., one or more of the account identifiers may be transmitted from the terminal 304 to the network 306 and thereafter the network 306 transmits the icon and/or information for a given account identifier to the terminal 304 for display on the display means 364), or a combination of both directly and indirectly. The user may employ the input means 362 to select one of the account identifiers to conduct a transaction.

When an account identifier has been selected by the user, the terminal 304 may communicate the selection to the network 306 and the network 306 may contact an associated server (e.g., an independent financial services server 56, a financial services application server 58 or a credit card servicer server 56*d*). Account information, such as the balance of the account, may be transmitted from the associated server through the network 306 and to the terminal 304 where it may be viewed by the user on the display means 364. A prompt may also be displayed on the display means 364 asking the user to initiate the transaction. The prompt may require the user to respond by pressing a key (e.g., a "Y" or "YES" key) or to input a security code (e.g., a PIN number or another predetermined code). In situations where the associated server is a credit card servicer server 56*d*, the terminal 304 may only provide the prompt. The proceeds of the transaction are routed through the network 306 to a retailer account 390 at the retailer's R the financial institution 392. Accordingly, transactions are posted to the retailer account 390 of a retailer R in or near real time, rather than batch processed.

The operator of the network 306 may levy a fee for a use of the network 306. For example, the operator of the network 306 may lay levy or charge a per transaction fee, which may be on the order of about $0.05 or less, that may be charged to the retailer R or to the consumer CU. If the consumer CU is directly charged, the network 306 may be configured to automatically draw the per-transaction fee from the account of the consumer CU. Additionally or alternatively, the retailer R and/or the account provider (i.e., the financial institution, broker, etc. where the account is maintained) may charge the consumer CU a per-transaction fee that may be collected via the network 306.

To populate a universal account card 302 (i.e., load the memory 310 of a universal account card 302), a read/write device 400 may be employed by the issuer of the universal account card 302 or in a user-accessible device, such as a personal computer 370 or a point-of-transaction machine 10. For purposes of discussion, the issuer of a universal account card 302 is a person, business or organization that distributes universal account cards 302 to consumers, in either a "blank" format or loaded with one or more account identifiers. Information to be stored in the memory 310 of the universal account card 302 may be input in any appropriate manner, such as by manual data entry, bar code scanning, the swiping of a magnetic stripe from a card, such as a credit card, or the transfer of information between electronic databases.

Bar code scanning may entail the use of a bar code scanner 410 that is employed to scan account information 412, which may comprise a routing number and an account number, from a statement 414 or other document that has been provided by a financial institution, a lender, a credit card provider, a securities broker, etc. Where the account identifier is configured to include a routing number and an account number, the information that is scanned by the bar code scanner 410 may be transmitted to the read/write device 400 and written to the memory 310 of the universal account card 302. Where the account identifier is configured with a coded or random sequence of characters, the information that is scanned by the bar code scanner 410 may be transmitted to the network 306, which correlates the sequence of characters to a routing number and account number and transmits the account identifier to the read/write device 400 where it may be written to the memory 310 of the universal account card 302.

The card reader 360 (or a dedicated magnetic stripe reader that is coupled to the terminal 304 or point-of-transaction machine 10) may be configured to read a conventional magnetic stripe from a card, such as a credit card. Account information 412 that is obtained from the magnetic stripe (i.e., routing and account numbers in the case of a credit card) may be employed to determine an associated account identifier that is stored to the memory 310 of the universal account card 302. In situations where the account identifier is configured to include a routing number and an account number, the information that is scanned from the magnetic stripe may be transmitted to the read/write device 400 and written to the memory 310 of the universal account card 302. Where the account identifier is configured with a coded or random sequence of characters, the information that is scanned from the magnetic stripe may be transmitted to the network 306, which correlates the sequence of characters to a routing number and account number and transmits the account identifier to the read/write device 400 where it may be written to the memory 310 of the universal account card 302. Where the terminals 304 and point-of-transaction machines 10 have the capability of reading a magnetic stripe, the network 306 may be used to conduct credit card directions without utilizing a discrete processor of the type that is employed in FIG. 5.

The transfer of information between electronic databases may entail the gathering of the user's financial information from one or more third parties, such as a credit reporting bureau or directly from each financial institution, lender, credit card provider, securities broker, etc. that is to be associated with a given user's universal account card 302.

Some interaction between the user of the universal account card 302 and the issuer of the universal account card 302 may be needed to ensure that the universal account card 302 is populated with the account identifiers that are desired by the user. In this regard, the interaction may take place in person, or electronically (e.g., via the Internet or e-mail), by telephone, by fax, or by mail.

While the invention has been described in the specification and illustrated in the drawings with reference to various embodiments, it will be understood by those skilled in the art that various changes may be made and equivalents may be substituted for elements thereof without departing from the scope of the invention as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise, above. Moreover, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A method of funding a transaction between a customer account and a merchant account, comprising: a customer receiving a communication of an amount for a purchase from the merchant, loading into a card reading terminal, a card of a customer to be used to complete the transaction, the card including a plurality of account identifiers of different accounts stored in a memory of the card, which can be used to fund a transaction, the account identifiers being stored in the memory by either scanning a document containing account identifier barcodes or by a card reader copying account identifiers from a magnetic strip of a different customer card into the card memory, verifying the customer through input of a Personal Identification Number (PIN) into the card reading terminal, selecting, by the verified customer, one of the accounts to be used for the transaction, the selection causing an associated server of the account to be contacted through a network, the associated server for the selected account causing the displaying of a prompt and real time information on the card reading terminal for the user to initiate the transaction and transferring funds, directly, in real time, from the selected account on the card to the merchant account, without the funds undergoing further processing, clearing, or verification by an intermediated or third party before the funds are transferred, to pay the merchant account to complete the transaction, whereby the customer and merchant directly settle through their own bank, the respective side of the transaction, and wherein the memory of the card stores account identifiers of accounts of merchants on the cards, permitting the direct and real time transferring of funds to occur.

2. The method of claim 1, wherein the account identifiers of accounts of merchants are receive from the card or provided by the institution directly.

3. The method of claim 1, wherein scanning the bar code comprises scanning account identifiers, to deposit onto the card.

4. The method of claim 1, wherein scanning the bar code comprises scanning account identifiers, such as, a routing number and an account number.

5. The method of claim 1, wherein storing the account identifiers comprises storing account identifiers onto the card through the card reader and terminal, such as, the routing number and the account number.

6. The method of claim 1, wherein copying the account information comprises, copying account identifiers, such as, a routing number and an account number to the memory.

7. The method of claim 1, wherein storing the account identifier comprises importing a routing number and an account number from the magnetic stripe card to the multiple account identifiers card.

8. The method of claim 1 wherein finding a transaction comprises the customer to authorize the transfer of funds by entering a PIN to conduct a banking or non-banking transaction.

9. The method of claim 1, wherein funding a transaction, comprises authorizing the transfer of funds directly from a credit card account.

10. The method of claim 1, further comprising: displaying, in real time, a balance related to at least one account associated with the respective account identifiers stored in the card memory.

11. The method of claim 1, further comprising: levying a fee for handling the funding of the transaction.

12. The method of claim 1, wherein transferring the funds to the merchant account comprises transferring at least a portion of the funds to a utility account.

13. The method of claim 1, wherein transferring the funds to the merchant account comprises making a payment on a loan with at least a portion of the funds.

14. The method of claim 1, wherein transferring the funds to the merchant account comprises transferring at least a portion of the funds to a securities account.

15. The method of claim 1, wherein transferring the funds to the merchant account comprises making a payment on a revolving line of credit with at least a portion of the funds.

16. The method of claim 15, wherein making the payment on the revolving line of credit comprises making a payment toward a credit card balance with at least a portion of the funds.

17. A computer readable medium encoded with a computer program product for facilitating the funding of a truncation between customer and merchant accounts, the computer program product being tangibly stored on a point of sale machine and at servers of the merchants comprising instructions operable to cause one or more processors to: store a plurality of account identifiers of a plurality of accounts usable by a customer to fund a transaction, into a memory of a card of the customer by either scanning a document containing account identifier barcodes or by a card reader copying account identifiers from a magnetic strip of a different customer card into the card memory; accept a selected account identifier stored in memory on a card presented by a user to fund a transaction; facilitate access to the selected customer account by verification of a customer through a Personal Identification Number (PIN) entry; receive real time information, including account balances associated with the account identifier; receive a command to complete a transaction and receive information on the amount required to complete the transaction, and responsive to the request of the card user, directly send the information to facilitate the transfer of funds in real time from the chosen account to a merchant account to complete a transaction; provide individual and aggregated account transaction information completed through the system; transfer funds in real time from the selected account of the customer to an account of the merchant to complete the transaction, whereby the customer and merchant each settle their side of the transaction directly through their own bank; transfer funds directly from the customer account to the merchant account without the funds undergoing further processing, clearing or verification by an intermediate or third party before funds are transferred, wherein the memory of the card stores account identifiers of accounts of merchants on the cards, permitting the direct and real time transferring of funds to occur.

18. The product of claim 17, wherein the second account is an account of a retailer; and further comprising instructions to:
facilitate the credit to the account of the retailer with at least a portion of the funds.

19. The product of claim 17, wherein the second account is an account of a retailer; and further comprising instructions to:
accept the transfer the funds directly from the first account to the retailer account.

20. The product of claim 17, further comprising instructions to: receive the account identifier information from the card and a terminal device having a card reader.

21. The product of claim 17, further comprising providing individual and aggregate account transaction information completed through the system.

22. The product of claim 17, further proving a transaction and authorization number for each transaction.

23. The method of claim 1, whereby the merchant credits at least a portion of the funds to the users chosen account.

24. The method of claim 1, whereby the user allows the merchant to credit at least a portion of the funds to a selected account by inputting a Personal Identification Number (PIN).

25. The method of claim 1, whereby the user selects the account identifier(s) that the merchant will credit at least a portion of the funds to the selected account.

26. A point of sale transaction system for funding a transaction between a customer and a merchant comprising: a point of sale terminal having a card reader to read a card of the customer, the card including a plurality of account identifiers of different accounts stored in a memory of the card which can be used to fund a transaction, a barcode reading device or a card reading device for storing the account identifiers in the memory by either scanning a document containing account identifier barcodes or by a card reader copying account identifiers from a magnetic stripe of a different customer card into the card memory, each account identifier being associated with an account from which funds can be transferred to fund a transaction, the point of sale terminal operable to permit the customer to select an account associated with one of the plurality of account identifiers stored on the card after customer verification by Personal Identification Number (PIN) entry into the point of sale terminal, displaying a prompt and real time account information to a customer whereby a customer selects an account to fund the transaction, a server connected to the point of sale terminal via a network, and operable, in response to a signal, to transfer funds in real time from the selected account of the customer to an account of the merchant to complete the transaction, whereby the customer and merchant each settle their side of the transaction directly through their own bank, and wherein funds are transferred directly from the customer account to the merchant account without the funds undergoing further processing, clearing or verification by an intermediate or third party before funds are transferred, and wherein and the memory of the card stores account identifiers of accounts of merchants on the cards, permitting the direct and real time transferring of funds to occur.

27. The point-of-sale transaction system of claim 26, further comprising a cash register communicably coupled to the point-of-sale terminal and sends a transaction amount to the card from the point-of-sale terminal.

28. The point-of-sale transaction system of claim 26, further comprising a vending machine communicably coupled to the point-of-sale terminal and sends a transaction amount to the card from the point-of-sale terminal.

29. The point-of-sale transaction system of claim 26, further comprising a parking meter communicably coupled to the point-of-sale terminal and sends a transaction amount to the card from the point-of-sale terminal.

30. The point-of-sale transaction system of claim 26, further comprising a ticket dispenser communicably coupled to the point-of-sale terminal and sends a transaction amount to the card from the point-of-sale terminal.

31. The point-of-sale transaction system of claim 26, further comprising a toll booth communicably coupled to the point-of-sale terminal and send a transaction amount to the card from the point-of-sale terminal.

32. The point-of-sale transaction system of claim 26, wherein at least one of the account identifiers comprises a routing number and an account number.

33. The point-of-sale transaction system of claim 26, wherein the first or selected account initiates the transfer the funds to the second account to conduct a banking transaction.

34. The point-of-sale transaction system of claim 26, wherein the first or selected account initiates the transfer the funds to the second account to conduct a non-banking transaction.

35. The point-of-sale transaction system of claim 26, wherein the funding account and merchant account can have the same or different financial institution.

36. The point-of-sale transaction system of claim 26, wherein the funding accounts' server initiates a transfer of funds directly to the merchant account, to fund a payment on a loan.

37. The point-of-sale transaction system of claim 26, wherein the funding accounts' initiates a transfer of funds directly to the merchant account to fund a payment on a revolving line of credit.

38. The point-of-sale transaction system of claim 26, wherein the funding account initiates a transfer of funds directly to the merchant account to fund a payment on a utility account.

39. The point-of-sale transaction system of claim 26, wherein the funding account initiates the transfer of funds directly to the merchant account to fund a securities transaction.

40. The system of claim 26, where the network can include a wide area network (WAN).

* * * * *